(No Model.)
J. S. McCARTNEY.
CATTLE STANCHION.
No. 363,902. Patented May 31, 1887.
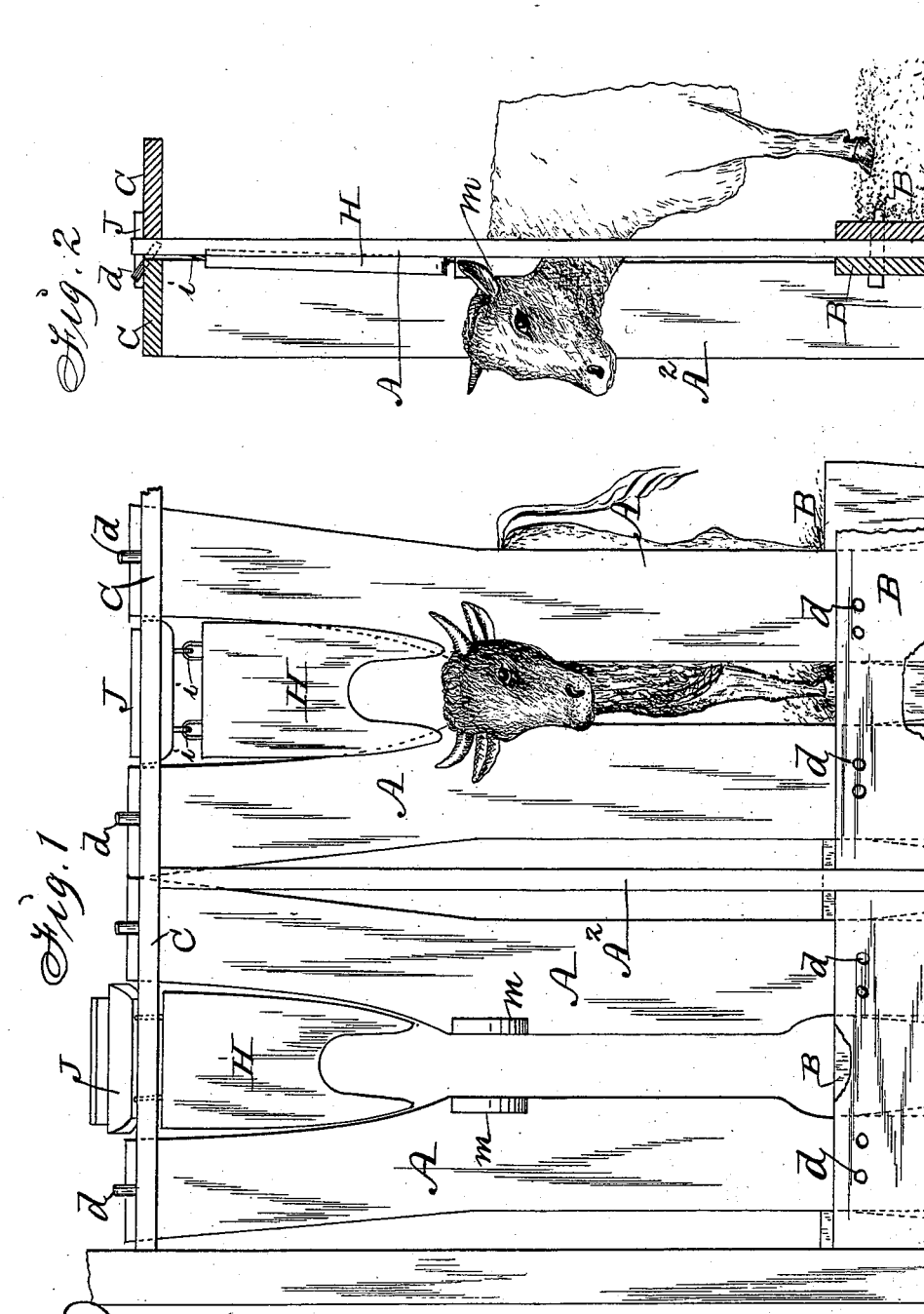

UNITED STATES PATENT OFFICE.

JAMES S. McCARTNEY, OF SIBLEY, IOWA.

CATTLE-STANCHION.

SPECIFICATION forming part of Letters Patent No. 363,902, dated May 31, 1887.

Application filed April 4, 1887. Serial No. 233,635. (No model.)

*To all whom it may concern:*

Be it known that I, JAMES S. MCCARTNEY, a citizen of the United States of America, and a resident of Sibley, in the county of Osceola and State of Iowa, have invented an Improved Cattle-Stanchion, of which the following is a specification.

My object is to provide a stanchion and cattle-fastening device that will be automatic in its operations and readily adjusted, so that when an animal's head is projected between the posts to get feed it will be fastened in such a manner that the animal will be free to lie down and get up at pleasure and have entire freedom in moving the body, but nevertheless securely fastened, so that it will require a person's attention to adjust the device before the animal can get away.

My invention consists in the construction and combination of adjustable mating posts and a suspended yoke, with a frame, fence, or building, as hereinafter set forth, pointed out in my claims, and illustrated in the accompanying drawings, in which—

Figure 1 is a front face view of two of my stanchions connected with a frame. Fig. 2 is an end view of Fig. 1, showing an animal fastened to the stanchion.

A A are wooden posts, preferably made of two-inch planks. Their inner and contiguous edges are cut away at their top portions, substantially as shown in Fig. 1, in such a manner that a horned animal's head can be readily passed through between the top portions of the mating-posts, but not at any lower point.

$A^2$ are partitions that prevent animals from getting their heads together to horn each other.

B B are planks set on edge at the bottom of the posts A, to form a base, to which the posts are adjustably connected by means of pins or keys passed through perforations in the base and posts, or in any suitable way, so that the space between the posts can be readily enlarged or diminished, as required to suit large and small and different kinds of animals.

C C are corresponding planks fixed to a frame, or building, or fence in such a manner that the top ends of the posts A will project up between them, as clearly shown in Fig. 2, to be detachably and adjustably connected therewith by means of pins $d$, or in any suitable way.

H represents a yoke or ox bow suspended between the top ends of the posts A by means of staples $i$ and a block, J, as shown in Fig. 1, or by means of ropes or chains, in such a manner that it will in its normal condition incline inward, so that its lower forked ends will rest against the posts A. The yokes may be made of the same kind of material from which the posts are made, or of any suitable material that will by force of gravity assume the position shown, as required to allow an animal to press it forward and inward to get the head through between the posts, and then prevent the animal's head from being withdrawn on account of the forked ends of the yoke overlapping the inner edges of the mating posts, as indicated by dotted lines in Fig. 1.

$m\ m$ represent blocks or fenders fixed to the inside faces of the posts A, to prevent an animal's horns from coming in contact with the forked ends of the yoke.

To accommodate an animal when lying down, parts of the lower ends of the posts A may be cut away, so that the head and neck can turn and lie flat when the animal is in lying position.

The heights of the posts and size of the yoke may vary to suit small calves, half-grown, and full-grown animals.

I claim as my invention—

1. In a cattle-stanchion, the combination of two mating posts having parts cut away from their inner or contiguous edges and top portions to admit an animal's head and a yoke suspended in said opening, to operate in the manner set forth.

2. A cattle stanchion and fastening device comprising two mating posts having parts of their inner and contiguous edges cut away, and a yoke suspended between the upper portions of said parts, and a frame, fence, or building to which the said posts and yoke are connected, to operate in the manner set forth.

3. The posts A, the parallel planks or bars B B and C C, the yoke H, and block J, constructed and arranged and combined with a frame, fence, or building, substantially as and for the purposes set forth.

4. The fenders $m$, in combination with the posts A, and a yoke suspended between the posts, substantially as and for the purposes stated.

Witnesses:       JAMES S. McCARTNEY.
  OLANDO J. CLARK,
  HENRY H. McCARTNEY.